United States Patent

Henschen

[15] 3,652,899

[45] *Mar. 28, 1972

[54] SUPPORT MEMBER FOR ELECTRONIC PACKAGING

[72] Inventor: Homer Ernst Henschen, Carlisle, Pa.

[73] Assignee: AMP Incorporated, Harrisburg, Pa.

[ * ] Notice: The portion of the term of this patent subsequent to Oct. 6, 1987, has been disclaimed.

[22] Filed: Dec. 5, 1969

[21] Appl. No.: 882,574

Related U.S. Application Data

[63] Continuation-in-part of Ser. No. 771,541, Oct. 29, 1968, abandoned.

[52] U.S. Cl. ....................................... 317/101 DH, 339/176

[51] Int. Cl. ....................................... H02b 1/02

[58] Field of Search ................317/101 CC, 101 D, 101 DH, 317/101 CM; 248/223, 201; 174/138, 138.5; 339/59, 176 NP, 17 C, 17 LC, 17 LM; 211/184, 41

[56] References Cited

UNITED STATES PATENTS

| | | | |
|---|---|---|---|
| 3,533,045 | 10/1970 | Henschen | 317/101 DH X |
| 2,802,958 | 8/1957 | Curley | 339/59 M UX |
| 2,836,215 | 5/1958 | Rapata | 174/158 UX |
| 2,894,303 | 7/1959 | Armstrong | 211/184 X |
| 3,154,281 | 10/1964 | Frank | 248/201 |
| 3,216,580 | 11/1965 | Fricker, Jr. | 211/41 |
| 3,274,450 | 9/1966 | Siebold | 317/101 CC |

*Primary Examiner*—David Smith, Jr.
*Attorney*—Curtis, Morris and Safford, William J. Keating, Frederick W. Raring, Adrian J. La Rue, Jay L. Seitchik, John P. Vandenburg and Ronald D. Grefe

[57] ABSTRACT

Plastic member, such as connector housing or printed circuit board supporting member, has mounting means thereon comprising spaced-apart parallel surfaces which are flexible towards each other and capable of undergoing resilient buckling in their own planes. A boss is provided on each surface intermediate its ends and has one side facing one end of the surface. Each boss has a projection extending beyond the one side and towards the one end of the surface. A shoulder is formed adjacent to the end of each surface in opposed relationship to the boss, these shoulders being spaced from the projections on the bosses by a distance equal to the thickness of the thinnest panel on which the member is to be mounted. If the member is to be mounted on a thicker panel, the surfaces buckle to accommodate the increased thickness.

13 Claims, 11 Drawing Figures

SUPPORT MEMBER FOR ELECTRONIC PACKAGING

This application is a continuation-in-part of my copending application Ser. No. 771,541, filed Oct. 29, 1968 now abandoned.

BACKGROUND OF THE INVENTION

It is common practice in the electrical and electronic arts to employ molded plastic members which are adapted to be mounted on panels such as housing panels on printed circuit mother boards. Conventionally, the mounting means is formed integrally with the plastic member and may take the form, according to prior art teachings, of latch arms and abutments adapted to bear against edge portions of the panel adjacent to a panel opening through which the part has been inserted; see, for example, U.S. Pat. Nos. 3,353,143, 2,891,103, and 3,196,380. Mounting devices of this type are provided on certain types of multicontact electrical connector housings, particularly those used in the appliance field and the automotive field.

Some of the requisites of a satisfactory mounting means for plastic members are that the mounting means be capable of firmly holding the part on the panel, that it have the ability of holding the part on panels of varying thicknesses, that the panel opening required for the mounting means be of a simple shape such as a rectangular or circular hole, and that the latch arms on other parts which secure the member to the panel be durable and rugged so that they will not be damaged by ordinary or even abusive handling.

The present invention is directed to the achievement of a mounting means which satisfies the foregoing desiderata and which can be used on a variety of types of plastic members or parts. The invention is particularly adapted to be used on printed circuit card guides which are mounted on printed circuit mother boards or similar panels and which function to support the edge portions of printed circuit cards or daughter boards.

It is accordingly an object of the invention to provide an improved mounting means on a molded plastic member for mounting the member in a panel opening. A further object is to provide a mounting means capable of firmly holding a plastic member on the panel on which it is mounted. A still further object is to provide a mounting means which can be used on a wide variety of plastic parts or members. A further object is to provide an improved printed circuit board card guide adapted to be mounted on a printed circuit mother board to support the edge portions of a printed circuit daughter board. A further object is to provide a combination card guide and standoff which functions to both support a printed circuit mother board in spaced relationship to a chassis and to support a printed circuit daughter board mounted on the printed circuit mother board.

These and other objects of the invention are achieved in preferred embodiments thereof which are briefly described in the foregoing abstract, which are described in detail in the specification which follows, and which are shown in the drawings in which.

Figure 1:
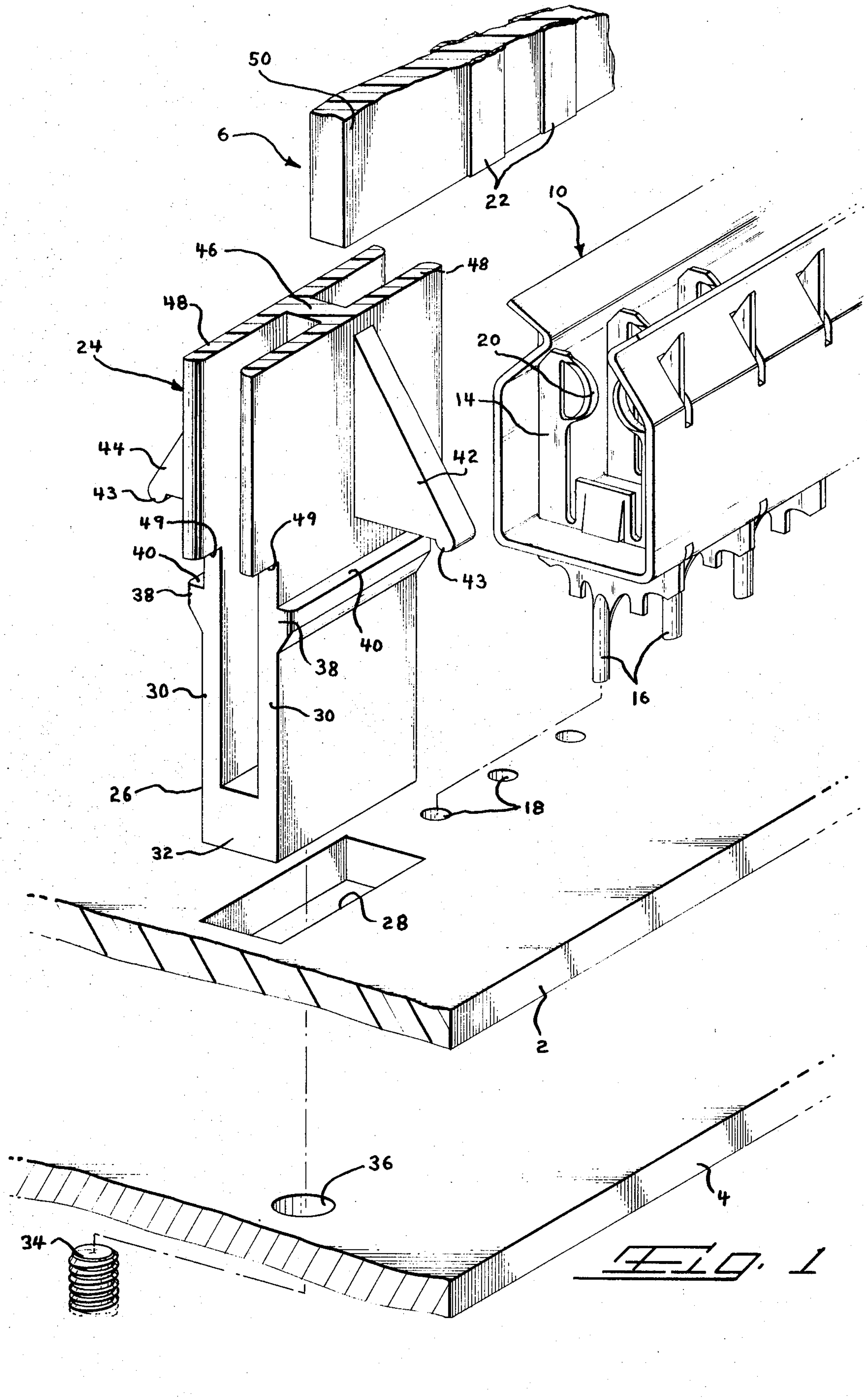
FIG. 1 is a fragmentary perspective exploded view showing the lower portion of a support member in accordance with the invention and illustrating the manner in which the support member is mounted on a chassis panel and a printed circuit mother board and further illustrating the manner in which the support member receives the edge portions of a printed circuit daughter board.
Figure 2:
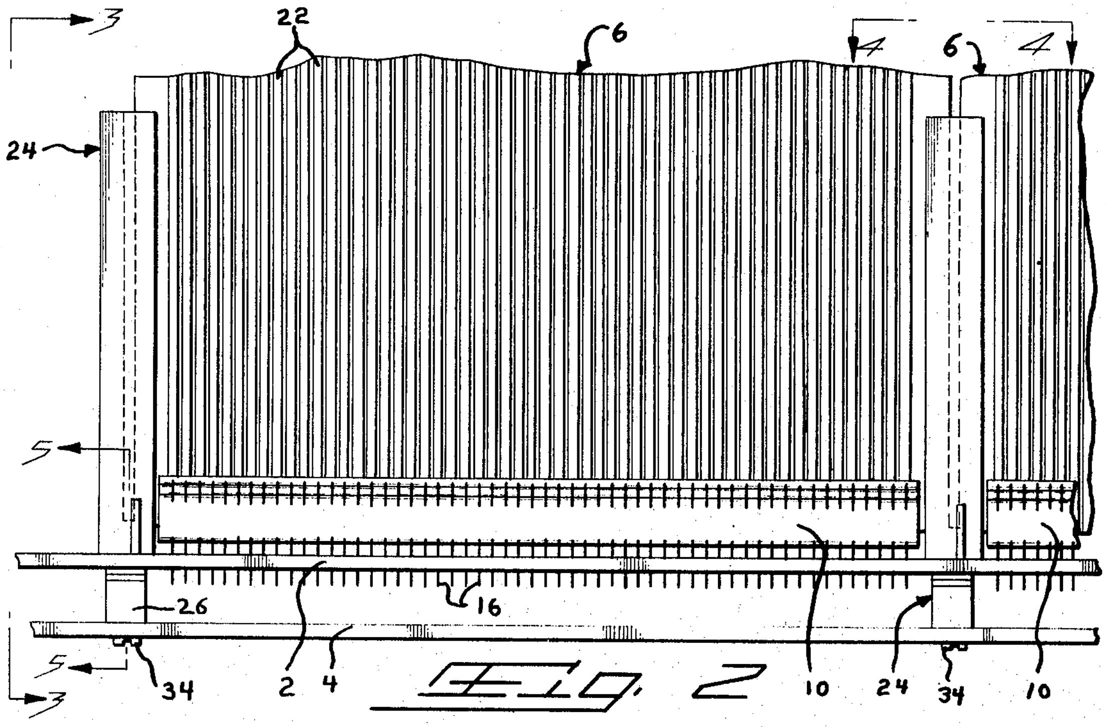
FIG. 2 is a fragmentary side view showing a chassis panel, a printed circuit mother board, and illustrating the mounting of a pair of supporting members in accordance with the invention on the chassis panel.
Figures 3, 4, 5:
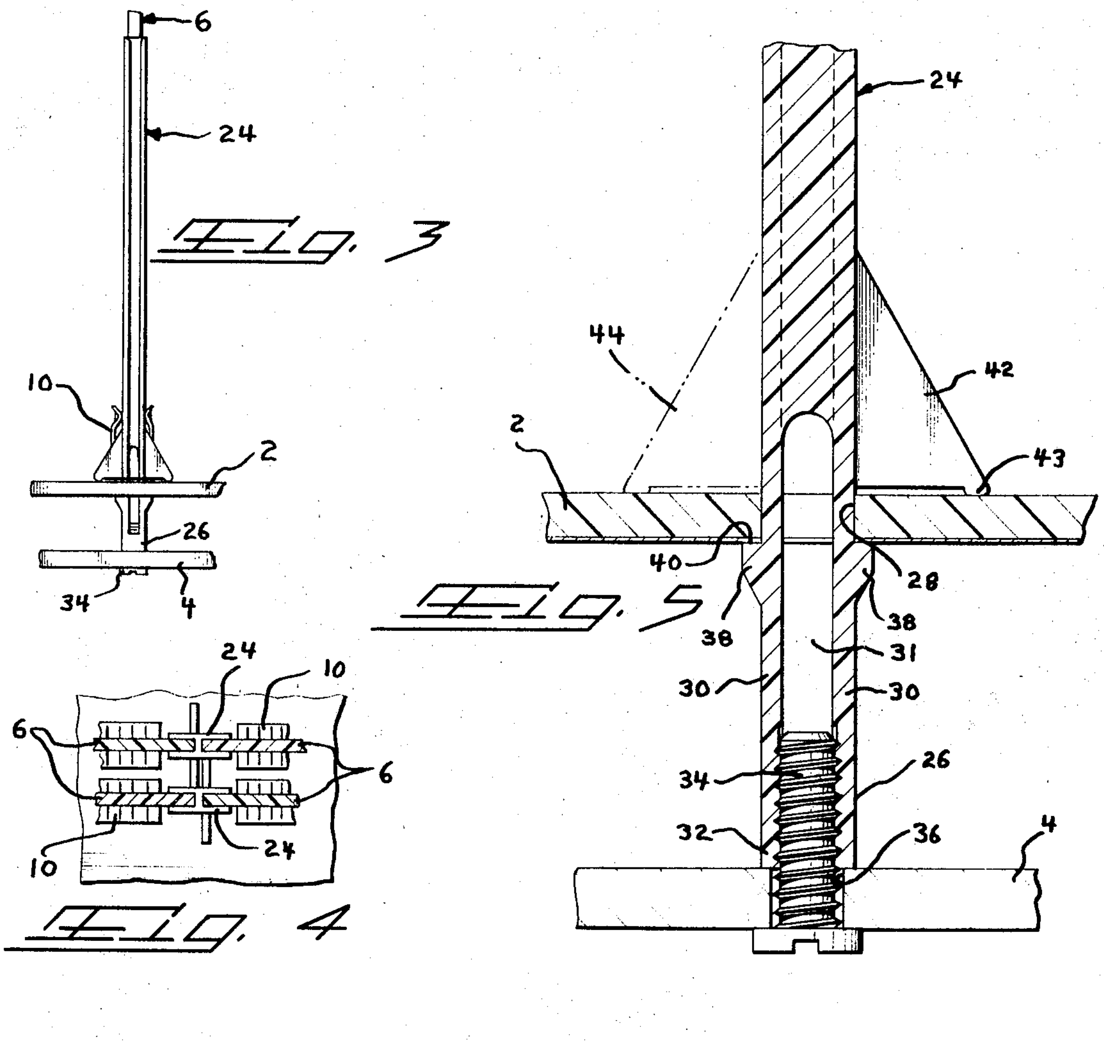

FIGS. 3, 4, and 5 are views taken along the lines 3—3, 4—4, and 5—5 of FIG. 2.

Figures 6, 7:
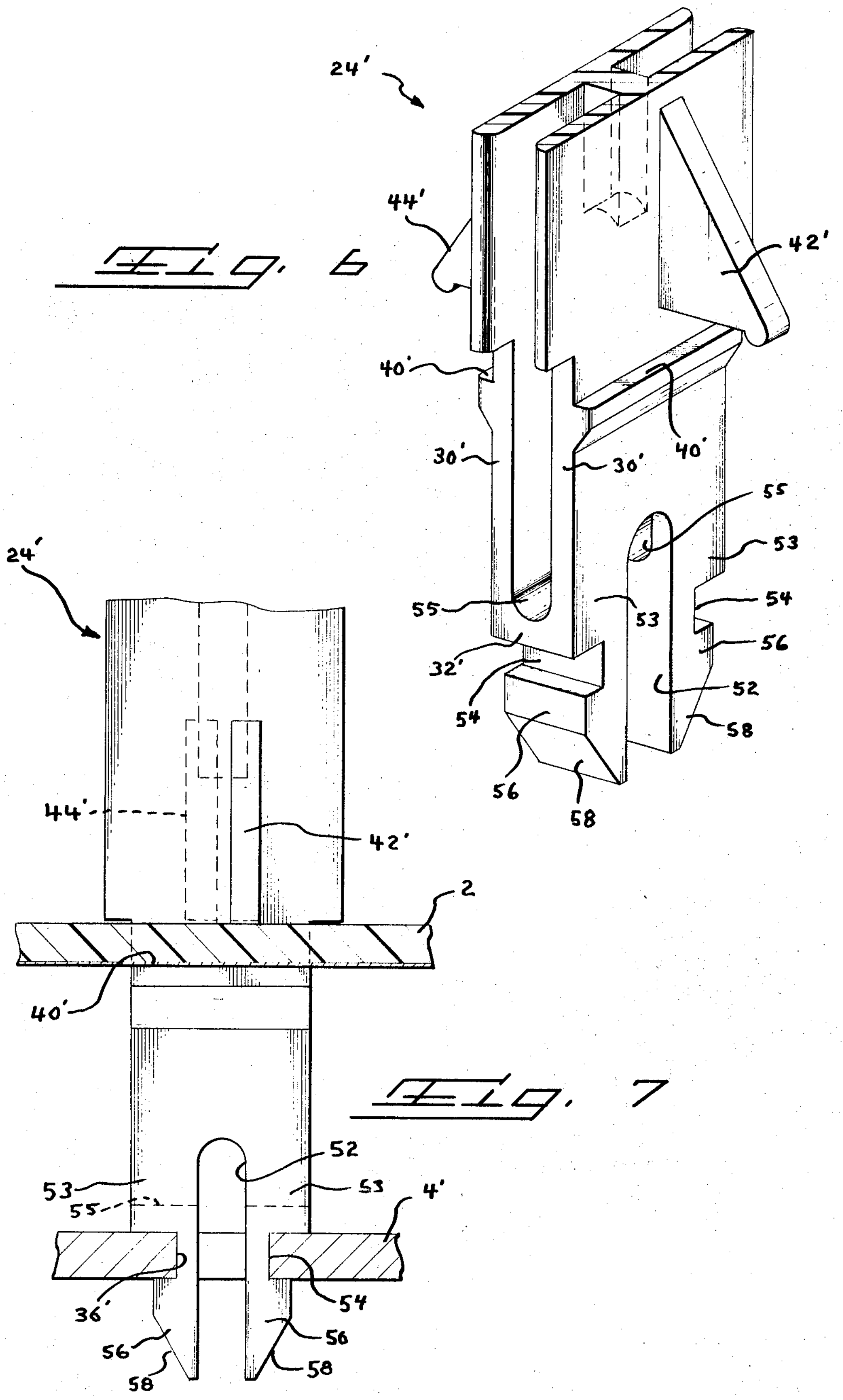

FIG. 6 is a perspective view of a support member in accordance with an alternative embodiment of the invention.

FIG. 7 is a view showing the support member of FIG. 6 mounted on a chassis panel in supporting relationship to a printed circuit mother board.

Figures 8, 9, 10, 11:
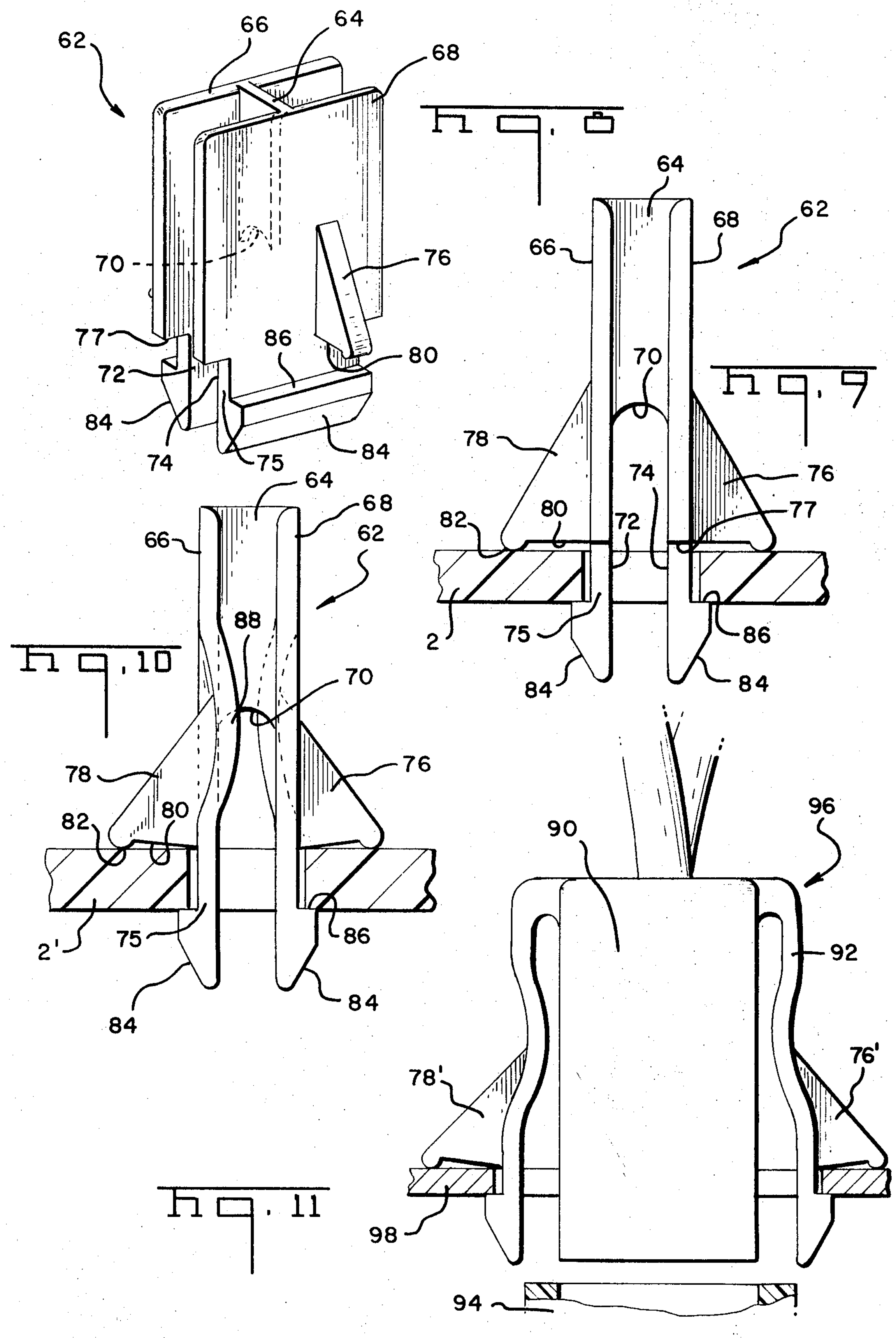

FIG. 8 is a perspective view of a further embodiment of the invention comprising a printed circuit card guide or printed circuit support which is mountable on a printed circuit mother board.

FIG. 9 is a sectional side view showing the support member of FIG. 8 mounted on a printed circuit mother board, the thickness of which is the minimum thickness for which the member is adapted to be mounted.

FIG. 10 is a view similar to FIG. 9 but showing the member mounted on a relatively thick printed circuit mother board.

FIG. 11 is a sectional side view showing a multicontact electrical connector having a mounting means in accordance with the invention integral therewith.

FIG. 8 shows a printed circuit board supporting member 62 having a mounting means on its lower end in accordance with the invention so that it can be mounted on a printed circuit mother board 2, FIG. 9. These printed circuit board supporting members or card guides as they are commonly called, are widely used in electronic packaging to support the edge portions of printed circuit daughter boards mounted on printed circuit mother boards as illustrated in FIG. 2.

The printed circuit board support member 62 is generally H-shaped in cross section having a web 64 and parallel sidewalls 66, 68. The web does not extend to the lower end of the member but terminates as shown at 70 so that the lower portions 72, 74 of the sidewalls are flexible towards each other in order to permit insertion of this lower end through a hole in a printed circuit mother board or a similar panellike member. A pair of generally triangular mounting ears 76, 78 are integral with the outwardly facing surfaces of the sidewalls 66, 68 and are disposed in offset relationship on these sidewalls with respect to each other to permit close spacing of the support members on a printed circuit board and to facilitate buckling of portions of the sidewalls as will be explained below. These mounting ears comprise right triangles having downwardly facing surfaces 80, which extend normally from the surfaces of the sidewalls, and projections 82 at their apices which extend slightly beyond the surfaces 80. The lower ends of the sidewalls are provided with laterally outwardly extending feet 84 which define upwardly facing shoulders 86 opposed to the surfaces 80 and the projections 82. The sidewalls are of reduced width in the vicinity of the feet 84 as indicated at 75 to define downwardly facing shoulders 77, these shoulders being coplanar with the surfaces 80 for reasons which will be explained below.

When the card guide 62 is to be mounted in a printed circuit mother board 2, a rectangular hole is provided in the board having dimensions slightly in excess of the width of the reduced lower portions 72, 74 of the sidewalls are merely flexed towards each other to permit the enlarged feet 84 to pass through the hole in the board are allowed to resume their normal positions after insertion has been completed. As shown in FIG. 9, the shoulders 86 lodge against the marginal edge portions of the underside of the board 2 while the projections 82 bear against the upper surface of the board and the shoulders 77 extend over the upper surface of the board. Because of the location of the projections 82, particularly their distance from the surfaces of the sidewalls 66, 68 and by virtue of the elongated bearing surfaces provided by these projections, an extremely stable mounting for the guide is achieved.

Printed circuit boards cannot be made to extremely close thickness dimensions and, in fact, the normal tolerances for the thickness of printed circuit boards is often stated to be ±10%. In some instances, it is in fact greater than ±10%: for example, printed circuit boards having a nominal thickness of 1/16 of an inch may have an actual thickness of from 0.054 inches to 0.071 inches. It follows that the mounting means for the card guide must be capable of accommodating these varying thicknesses without sacrifice of the rigidity of the mounting.

In accordance with the preferred embodiment of the instant invention, the mounting means on the card guide is formed with the distance between the surfaces 77, 80 and the shoulders 86 equal to the maximum board thickness which will be encountered; thus for a nominal 1/16 inch board, this distance would be 0.071 inches. The distance between the surfaces of the projections 82 and the surfaces of the shoulders 86 is made equal to the minimum board thickness which, in the case of a 1/16 inch board, would be 0.054 inches. When the card guide is mounted on a relatively thin board, as shown in FIG. 9, the board will be gripped between the surfaces of the projections 82 and the shoulders 86 as explained above. When the card guide is mounted on a relatively thick board 2', FIG. 10, the ears 76, 78 are pivoted about their lower ends through slight arcs in opposite directions, that is their upper ends are moved relatively inwardly and the apices on which the projections 82 are provided are moved outwardly. The stresses developed are transmitted to the surfaces of the sidewalls 66, 68 which are buckled somewhat as shown at 88 to accommodate this movement. There is a slight reduction in the spacing between the opposed surfaces of the sidewalls as indicated in FIG. 10 but this does not interfere with insertion of the printed circuit board since this spacing is normally made somewhat greater than the board thickness. It should also be noted that the deflection takes place in this preferred embodiment only on one side of each sidewall, that is the side on which the locking ear 76 or 78 is mounted and is not transmitted to the opposite side.

After the card guide has been mounted on the board 2, it is held firmly in place by virtue of the tendency of the ears to return to their normal positions. The buckled and stressed sidewalls urge the ears downwardly and against the board surface and a counter pressure is developed by the shoulders 86 on the underside of the board.

The card guide of FIGS. 8–10, and the other embodiments of the invention described below, are preferably manufactured by an injection molding process using a material which is comparatively firm in thick sections but stiffly flexible in relatively thin sections. A degree of flexibility is required in order to permit flexure of the lower portions 72, 74 of the sidewalls towards each other during insertion of these lower portions through the panel opening and in order to permit the buckling of the sidewalls as illustrated. Zytel 101, a nylon produced by DuPont has been found to be highly satisfactory for support members in accordance with the invention and other materials having equivalent properties would be equally suitable.

FIGS. 1–5 show an alternative embodiment of the invention which is adapted to support a printed circuit mother board 2 in spaced relationship to a chassis panel or other structural panel 4 and, in addition, function as a card guide for a printed circuit board 8. The printed circuit board has conductors 22 on its faces which are contacted by the contact portions 20 of terminals 14. As explained in my copending application Ser. No. 716,491, now U.S. Pat. No. 3,503,036, the post portions 16 of these terminals extend through small diameter holes 18 in the mother board 2 and are soldered to conductors on the underside of the mother board. As shown in FIG. 2, the support and guide member 24 receives the edge portions 50 of the printed circuit daughter board when the board is engaged with the terminals in the connector 10.

The support member 24 comprises an elongated column-like member of suitable insulating material such as a firm nylon, having one end 26 of reduced width which is adapted to be inserted through a rectangular opening 28 in the printed circuit mother board until it bears against the surface of the chassis panel 4. The supporting member is secured to the chassis panel by means of a screw 34, which may be of the self-tapping type, which extends through an opening 36 in the chassis panel and is threaded into the solid end section 32 of the support. A pair of transversely extending ribs 38 are provided on the opposite faces of the support adjacent to the lower end thereof and define upwardly facing shoulders 40 which bear against the underside of the printed circuit mother board 2 after insertion. In order to permit passage of the lower end 26 of the support through the rectangular opening 28 in the mother board, the lower end of the support has a transversely extending opening 31 which permits inward flexure of the sides 30 while the ribs 38 are passing through the opening 28.

Supporting member 24 is stabilized with respect to the mother board by means of downwardly facing shoulders 49 which bear against the upper side (as viewed in the drawing) of the mother board, and by triangular stabilizing ears 42, 44 which extend normally from the opposite faces of the support and which have bearing projections 43 on their ends. As with the embodiment of FIG. 8, these triangular ears are offset with respect to each other on the opposite sides of the support, an arrangement which permits extremely close spacing of two supports in accordance with the invention on the mother board as illustrated in FIG. 4.

The portion of the support member which extends upwardly in FIG. 2 above the upper surface of the mother board 2 has a generally H-shaped cross section and comprises a transversely extending web 46 and sidewalls 48. The sidewalls 48 have their inner surfaces spaced apart by an amount substantially equal to, and slightly greater than, the thickness of the printed circuit daughter board 6 so that they define slots adapted to receive the edge portions 50 of the daughter boards.

With respect to its adaptability to printed circuit mother boards of varying thicknesses, the combination chassis support-card guide of FIGS. 1–7 functions in the same manner as the embodiment of FIG. 8. Thus FIG. 5 shows this support member mounted on a printed circuit mother board 2 having a thickness which is equal to the vertical spacing between the surfaces of the shoulders 40 and the bearing surfaces of the projections 43. If the support members were to be mounted on a board having a thickness greater than the board shown in FIG. 5, the ears 42, 44 would be pivoted outwardly about their lower ends to accommodate the increased thickness as shown in FIG. 10.

It will be noted that the ears 42, 44 of the embodiment of FIGS. 1–5 are relatively thinner than the ears 76, 78 of the embodiment of FIG. 8. The wider ears of the embodiment of FIG. 8 are ordinarily preferable because of their greater surface areas and, hence, their increased stability as compared to the stabilizing ears of the embodiment of FIGS. 1–5 however, the thinner ears have been found to be adequate under many circumstances.

For many circuit and packaging arrangements, it will be found that if support members in accordance with the embodiment of FIGS. 1–5 are provided for all of the printed circuit daughter boards, mounted on the mother board the lower portions of the support members will adequately support the printed circuit mother board 2 on the chassis panel 4. However, if support for the mother board is required beyond that provided by the support members 24 used to support the daughter boards, such additional support for the mother board can be provided by merely cutting off the upper portions of the desired number of support members and mounting them on the chassis panel and in supporting relationship to the mother board.

FIGS. 6 and 7 show a further embodiment of the invention 24' which is adapted to be secured to the chassis panel by a detent means rather than by the use of a fastener. The lower end 32' of this embodiment is somewhat longer than the lower end 32 of the embodiment of FIG. 1 and is slotted as shown at 52, this slot extending upwardly from the lower end of the support and intersecting the sides 53. Notches 54 are provided on each side of the slot 52, the portions of the support below these notches being of reduced width, as shown at 56, and being beveled as shown at 58. It will also be apparent from FIGS. 6 and 7 that the slot 52 extends beyond the lower portions 55 of the opening 31.

The support 24' is assembled to the printed circuit daughter board 2 in the same manner as the previously described embodiments, that is, by flexing the side portions 30' inwardly until the printed circuit mother board is supported on the shoulders 40' and the ears 42',44'. The support can then be mounted on the chassis panel by merely flexing the end section of the support on each side of the slot 52 inwardly until this end section is passed through a rectangular opening 36′ in the chassis panel 4′. The portions of the chassis panel immediately adjacent to the hole 36′ enter the notches 54 to secure the support to the panel.

As previously mentioned, mounting means in accordance with the invention can be provided on members other than support members of the types shown in FIGS. 1–10 of the drawing. For example, FIG. 11 shows one part 96 of a multicontact electrical connector mounted in an opening in a panel 98. The connector part 96 has cantilever arms 92 extending forwardly from opposite sides of its body portion 90 in which the contact terminals 90 are mounted. At their forward ends, these arms are provided with locking bosses 76′, 78′ which are opposed to enlarged feet 84′ on the ends of the arms as previously described. FIG. 10 shows the housing 90 as being mounted in a relatively thick panel so that the arms 92 are buckled intermediate their ends as explained above. It will be understood that the housing can also be mounted in a relatively thin panel in which case no buckling would take place. When the mating connector part 94 is mated with the housing 90, the hood portion of this mating connector part will extend between each of the arms and the surface of the housing 90 thereby to prevent any accidental dislodgement of the housing from the panel.

Multicontact electrical connectors of the type shown in FIG. 11 are widely used on electrical harnesses in the automotive and appliance fields. The contact terminals contained in the connector housings 94, 96 are crimped onto wires 98 so that when the two connector parts are coupled, the wires extending to the contact terminals are connected. One of the housing parts is frequently provided with a mounting means so that it can be mounted in a panel such as a frame panel of a washing machine or the fire wall of an automobile.

Changes in construction will occur to those skilled in the art and various apparently different modifications and embodiments may be made without departing from the scope of the invention. The matter set forth in the foregoing description and accompanying drawings is offered by way of illustration only.

I claim:

1. Supporting means for supporting a printed circuit mother board in spaced relationship to a panel, such as a chassis panel, and for supporting a printed circuit daughter board on said mother board, said supporting means comprising:
an elongated column-like member of insulating material having mounting means at one end thereof for mounting said member on said panel with its axis extending normally of the plane of said panel,
mother board supporting means adjacent to said one end for supporting said printed circuit mother board,
daughter board supporting means on opposite sides of said member, said daughter board supporting means extending from a location adjacent to said mother board supporting means to the other end of said member whereby,
a plurality of said members mounted on a panel are capable of supporting a printed circuit mother board in spaced relationship to said panel, and each member is adapted to support edge portions of printed circuit daughter boards on said printed circuit mother board.

2. A support as set forth in claim 1 wherein said mother board supporting means comprises lateral projections on opposite sides of said member, said projections being adapted to bear against the upper and lower surfaces of said mother board.

3. A support as set forth in claim 1 wherein said member has a transversely extending opening therein adjacent to said one end, said opening permitting partial collapse of said member in a lateral direction to permit insertion of said one end through said mother board prior to mounting of said member on said panel.

4. A support as set forth in claim 1 wherein said daughter board supporting means comprises slots on opposite sides of said member, said slots being adapted to receive edge portions of printed circuit daughter boards.

5. A support as set forth in claim 1 wherein said mounting means comprises means on said one end of said member for engaging opposite sides of said panel.

6. A support as set forth in claim 1 wherein said mounting means comprises latching means on said one end of said support.

7. A support as set forth in claim 6 wherein said latching means comprises a slot extending inwardly from said one end to permit partial collapse of said one end upon movement thereof through an opening in said panel and means on said one end for interengagement with said panel.

8. In combination with a supporting chassis, a printed circuit mother board extending parallel to said chassis, and a plurality of printed circuit daughter boards mounted on said printed circuit mother board, supporting means for said mother and daughter boards comprising:
a plurality of barlike supporting members of insulating material, said members being mounted on said chassis and extending normally therefrom through, and beyond, said printed circuit mother board, mother board supporting means intermediate the ends of said members engaging said printed mother board and supporting said printed circuit mother board in spaced relationship to said chassis, and the portions of said supporting members which extend beyond said printed circuit mother board having daughter board supporting means on their sides for supporting edge portions of said printed circuit daughter boards.

9. The combination set forth in claim 8 wherein said mother board supporting means comprises laterally extending projections on opposite sides of said members, said projections bearing against the surfaces of said mother board.

10. A device adapted to be mounted on a printed circuit mother board and to support one edge of at least one printed circuit daughter board, said device comprising:
a columner plastic member of a relatively firm plastic material which is stiffly flexible in thin sections, said member having an H-shaped cross section throughout a major portion of its length, said H-shaped cross section comprising a web and sidewalls,
said web extending only partially along the length of said member and being discontinuous adjacent to one end of said member whereby said sidewalls can be flexed towards each other adjacent to said one end,
each of said sidewalls having a laterally outwardly extending ear on its external surface proximate to said one end, said ears each having a side facing said one end, said sides having projections thereon extending towards said one end, said ears being equidistant from said one end,
a shoulder on said external surface on each of said sidewalls, said shoulders being between said ears and said one end, said shoulders facing said ears,
said shoulders being spaced from said sides of said ears by a distance D′ and from said projections by a distance D whereby,
said member can be mounted in openings in panels having thicknesses ranging from D to D′ upon flexing said sidewalls towards each other at said one end and inserting said one end through said opening until said shoulders bear against said panel on one side thereof and said ears are against said panel on the other side thereof, said sidewalls being undeformed and said projections being in engagement with said other side when said panel has a thickness of D, and said sidewalls being buckled in the vicinity of said ears when said panel has a thickness which is greater than D and no greater than D′.

11. A device as set forth in claim 10 wherein said sidewalls have means at said one end for securing said member to a panel, such as a chassis panel, which is spaced from said printed circuit mother board.

12. A support member as set forth in claim 10 wherein said ears are triangular.

13. A support member as set forth in claim 12 wherein said ears are offset on said sidewalls with respect to each other thereby to permit location of two of said devices adjacent to each other on said panel.